(12) United States Patent
Bostelmann

(10) Patent No.: US 12,554,018 B2
(45) Date of Patent: Feb. 17, 2026

(54) METHOD OF APPARATUS FOR DETERMINING DISTANCE INFORMATION

(71) Applicant: Basler AG, Ahrensburg (DE)

(72) Inventor: Johannes Bostelmann, Tostedt (DE)

(73) Assignee: Basler AG, Ahrensburg (DE)

( * ) Notice: Subject to any disclaimer, the term of this patent is extended or adjusted under 35 U.S.C. 154(b) by 1197 days.

(21) Appl. No.: 17/469,949

(22) Filed: Sep. 9, 2021

(65) Prior Publication Data
US 2022/0075071 A1 Mar. 10, 2022

(30) Foreign Application Priority Data
Sep. 10, 2020 (DE) .......................... 102020123652.2

(51) Int. Cl.
*G01S 17/894* (2020.01)
*G01S 7/481* (2006.01)
*G01S 7/4865* (2020.01)
*G01S 17/32* (2020.01)

(52) U.S. Cl.
CPC .......... *G01S 17/894* (2020.01); *G01S 7/4816* (2013.01); *G01S 7/4865* (2013.01); *G01S 17/32* (2013.01)

(58) Field of Classification Search
CPC ..... G01S 7/4816; G01S 7/4865; G01S 17/894
USPC .......................................................... 356/5
See application file for complete search history.

(56) References Cited

U.S. PATENT DOCUMENTS

| 7,872,583 | B1 | 1/2011 | Yushkov et al. |
| 8,077,091 | B1 * | 12/2011 | Guigne ................. G01S 5/0215 342/465 |
| 9,405,008 | B2 | 8/2016 | Raskar et al. |
| 9,542,749 | B2 | 1/2017 | Freedman et al. |
| 9,753,128 | B2 | 9/2017 | Schweizer et al. |
| 10,062,201 | B2 * | 8/2018 | Nowozin .............. G01S 7/4918 |
| 11,029,149 | B2 * | 6/2021 | Ortiz Egea ........... H04N 23/56 |
| 2017/0269201 | A1 * | 9/2017 | Adachi ................. G01S 13/931 |
| 2018/0011119 | A1 | 1/2018 | Perry et al. |
| 2018/0011195 | A1 | 1/2018 | Perry et al. |

FOREIGN PATENT DOCUMENTS

| DE | 19704496 C2 | 2/2001 |
| DE | 10039422 A1 | 2/2002 |
| DE | 102014013099 A1 | 3/2016 |
| DE | 102015225192 A1 * | 6/2016 ............. G01S 7/497 |

OTHER PUBLICATIONS

Sherman, "Complex Indicated Angles Applied to Unresolved Radar Targets and Multipath". IEEE Jan. 1971. (Year: 1971).*

(Continued)

*Primary Examiner* — Robert W Hodge
*Assistant Examiner* — Kara M. Richter
(74) *Attorney, Agent, or Firm* — Dickinson Wright PLLC

(57) ABSTRACT

The invention relates to a method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object.

10 Claims, 8 Drawing Sheets

(56) References Cited

OTHER PUBLICATIONS

Jimenez, et al. "Modelling and correction of multipath interference in time of flight cameras", IEEE Jul. 2012. (Year: 2012).*
German Search Report for related German Application No. 102020123652.2; dated: Apr. 7, 2021; 11 pages.
Bhandari, A., Feigin, M., Izadi, S., Rhemann, C., Schmidt, M. & Raskar, R., Resolving Multipath Interference in Kinest: An Inverse Problem Approach, 2014.
Godbaz, J., Cree, M., & Dorrington, A., Closed-form Inverses for the Mixed Pixel/Multipath Interference Problem in AMCW Lidar, 2012, v. 8296, Hamilton, New Zealand.
Gupta, M., Velten, A., Nayar, S. & Breitbach, E., What Are Optimal Coding Functions for Time-of-Flight Imaging, 2017.
Bhandari, A., Kadambi, A., Whyte, R., Barsi, C., Feigin, M., Dorrington, A., Resolving Multi-path Interference in Time-of-Flight Imaging via Modulation Frequency Diversity and Sparse Regularization, 2014, v. 39.
Dorrington, A. A., Godbaz, J. P., Cree, M. J., Payne, A. D., & Streeter, L. V., Separating true range measurements from multi-path and scattering interference in commercial range cameras, 2011, v. 7864.

* cited by examiner

METHOD OF APPARATUS FOR DETERMINING DISTANCE INFORMATION

The invention relates to a method from telecommunications, in particular image processing for distance determination, for example using time-of-flight cameras (TOF cameras). In accordance with different embodiments, a method of determining distance information, in particular of determining at least one piece of distance information for a three-dimensional image from at least two time-of-flight differences, is provided.

The invention also relates to a camera system and a computer program (that can, for example, be executed as a computer program product).

The determination of spacings or distances is an essential component of various applications, for example in autonomous vehicles or in automatic quality control. For example, radar or lidar sensors can be used for distance determination. Another approach comprises using TOF cameras in which the distance between the camera and the object can be determined based on the time of flight from the camera to an object and back. The phase or amplitude information of emitted light signals after reflection is in particular evaluated in so doing. A method and an apparatus for such an evaluation are known from DE 197 04 496 C2.

However, problems due to the reflection of transmitted signals at different surfaces arise on the determination of distances based on time-of-flight differences. In this so-called multipath case, exactly one reflection of the transmitted signal is then namely no longer received, but rather a superposition of a plurality of reflections. The accuracy of the determination of the distance using common methods is thereby impaired. There are approaches for compensating the effects of the multipath case. One possible approach is, for example, described in U.S. Pat. No. 9,753,128 B1, with, however, a closed solution not being provided, but rather an iterative approximation method.

It is therefore an object of the invention to provide an accurate and efficient distance determination even when a transmitted signal is reflected at different surfaces. This should preferably take place in closed form, which guarantees that a solution can be determined reliably and in a previously determined time.

This object is satisfied by a method having the features of claim 1 of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, in particular in that the method comprises: controlling the light source to transmit a plurality of light signals, wherein each light signal has a temporal intensity curve based on a respective frequency, wherein at least a first frequency and a second frequency different from the first frequency are used; determining at least a first value of light signals received in the time-of-flight camera in the first frequency; determining at least a second value of light signals received in the time-of-flight camera in the second frequency; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is further based on the determination of an angle that corresponds to a complex number, which is dependent on the first value and the second value, in polar representation.

In an embodiment of the method, the angle is determined based on a calculation of an arc tangent based on the first value and the second value.

In accordance with an embodiment, the at least a first value comprises two first component values that can be represented as a first complex number, wherein the at least a second value comprises two second component values that can be represented as a second complex number; and wherein the angle is determined based on a value or values that corresponds/correspond to a difference between the second complex number and the square of the first complex number.

The object of the invention is also satisfied by a further method, in particular by a method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises: controlling the light source to transmit a plurality of light signals, wherein each light signal has a temporal intensity curve based on a respective frequency, wherein at least a first frequency and a second frequency different from the first frequency are used; determining at least one first value of light signals received in the time-of-flight camera in the first frequency, the at least a first value comprises two first component values that can be represented as a first complex number; determining at least one second value of light signals received in the time-of-flight camera in the second frequency, wherein the at least a second value comprises two second component values that can be represented as a second complex number; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is further based on a value or values that corresponds/correspond to a difference between the second complex number and the square of the first complex number.

The object of the invention is also satisfied by a further method, in particular by a method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises: controlling the light source to transmit a plurality of light signals, wherein each light signal has a temporal intensity curve based on a respective frequency, wherein at least a first frequency and a second frequency different from the first frequency are used; determining at least a first value of light signals received in the time-of-flight camera in the first frequency; determining at least a second value of light signals received in the time-of-flight camera in the second frequency; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is based solely on analytical calculations, and/or exact calculations, and/or non-iterative calculations, and/or non-approximate calculations. Therefore, no further calculations (in particular no approximate or iterative calculations) are used in addition to analytical calculations, exact calculations, non-iterative calculations, and/or non-approximate calculations.

The object of the invention is also satisfied by a further method, in particular by a method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises: controlling the light source to transmit a plurality of light signals, wherein each light signal has a temporal intensity curve based on a respective frequency, wherein at least a first frequency and a second frequency different from the first frequency are used; determining at least a first value of light signals received in the time-of-flight camera in the first frequency; determining at least a second value of light signals received in the time-of-flight camera in the second frequency; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is further based on a normalization of the respective signals based on a total scalar value that is based on the first value and the second value.

In accordance with an embodiment, the normalization is based on a determination of zero points of a third degree polynomial or a higher degree polynomial.

In accordance with an embodiment, the at least a first value comprises two first component values that can be represented as a first complex number and the at least a second value comprises two second component values that can be represented as a second complex number, wherein a normalization factor of the normalization is determined based on a value or values that corresponds/correspond to a difference between the second complex number and the square of the first complex number.

In accordance with an embodiment, the first value corresponds to a first intensity or a first intensity difference and the second value corresponds to a second intensity or a second intensity difference.

In accordance with an embodiment, the at least a first value comprises two first intensities or two first intensity differences that are determined phase shifted by at least substantially 90° with respect to one another; and the at least a second value comprises two second intensities or two second intensity differences that are determined phase shifted by at least substantially 90° with respect to one another.

In accordance with a further development, the second frequency is (at least substantially) twice as large as the first frequency.

The object of the invention is also satisfied by a further method, in particular by a method of determining a piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises: determining at least two paths of the emitted light signals from the light source to the image sensor using one of the methods described above; determining distance information based on at least three paths of the emitted light signals from the light source to the image sensor by means of an iterative numerical method, wherein, for the iterative numerical method, at least three start values for the at least three paths are determined based on the determined at least two paths.

The object of the invention is also satisfied by a camera system, in particular a camera system comprising a time-of-flight camera, which has a light source, an image sensor and a synchronization device, and a processing unit, for performing one of the methods described above.

The object of the invention is also satisfied by an apparatus, in particular an apparatus comprising a synchronization device and a processing unit, that is configured to perform one of the methods described above.

The object of the invention is also satisfied by a computer program, which can in particular be provided as a computer program product, wherein the computer program is suitable for storage on a data carrier and is configured to cause a computer apparatus to perform one of the methods described above when the computer program is executed on the computer apparatus.

The aspects of the invention described herein, that is the methods, the camera system, the apparatus and the computer program, can naturally and advantageously be further developed in the sense of all the embodiments described with respect to respective other aspects.

The invention will be explained only by way of example in the following with reference to the schematic drawing.

Figure 1A:
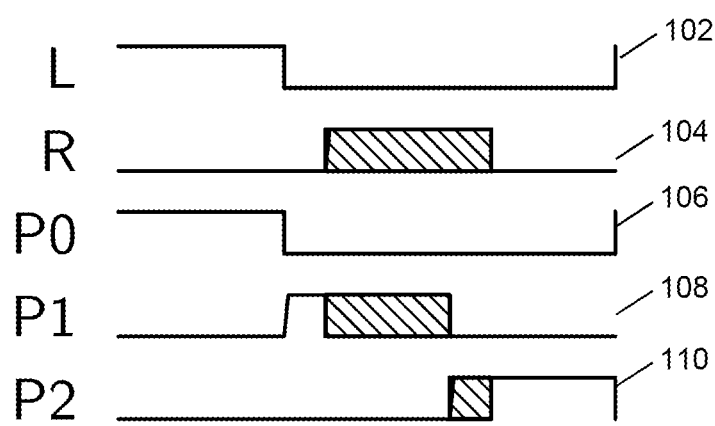
FIG. 1A shows an illustration of a signal control for three photodiodes having rectangular pulses.

Time-of-flight cameras (ToF cameras) transmit periodically modulated light pulses (in other words: light signals). They are reflected by objects. The finite speed of light causes a phase shift between the transmitted (in other words: emitted) light and reflected light. This phase shift corresponds to the time of flight of the light and is measured by the camera. The distance d between the camera and the object is proportional to the time of flight of the light $\delta$. Therefore, this distance d can be determined from the phase shift for each pixel and a distance image can be formed therefrom:

$$d = \frac{c}{2} \cdot \delta \tag{1.1}$$

In this respect, c describes the speed of light in the surrounding medium, for example in air. The light covers the distance there and back twice. This justifies the 2 in the denominator of the formula (1.1).

The period length is described by an interval I here. Within this interval, the determination of the distance is possible in a unique manner. If the period length exceeds the length of the interval I, an ambiguity can occur that is designated as depth aliasing.

To obtain a typical depth accuracy in the range of centimeters, a required time resolution of the measurement of approximately 66.71 ps results with the equation (1.1). It is thus particularly important to determine the time of flight of the light very precisely. This can be achieved by the sensor design described in the following.

A ToF image sensor has a matrix-shaped arrangement of pixels. Each pixel is equipped with at least one electronic shutter that is also designated as a shutter. A shutter is opened or closed by a control signal in each case. If a shutter is open, the pixel collects the incident light and generates an electrical signal, which is associated with this shutter, therefrom. In ToF image sensors, a shutter can usually be opened or closed a multiple of times in succession, wherein the collection of the light is continued or interrupted in each case. The i-th shutters of a plurality of pixels are each switched by a common i-th control signal. For an easier understanding, a pixel will be considered by way of example in the following.

The measured signal at the i-th shutter of the pixel $S_i(\delta)$ is described as follows in dependence on the phase shift in the mathematical model. The reflected light pulse is modeled as the function $l_{ref}$ that indicates the intensity of the reflected light in dependence on time. The opening and closing of the shutters is described by the shutter function $p(t):I\to[0,1]^n$. A one indicates an open shutter and a zero indicates a closed shutter. Values therebetween can model a partly open shutter. The cross-correlation is formed from the two functions $l_{ref}$ and the i-th component of the shutter function pi and is evaluated for the phase shift $\delta$:

$$S_i(\delta)=\int l_{ref}(t-\delta)p_i(t)dt=\int l_{ref}(t)p_i(t+\delta)dt=:(l_{ref}*p_i)(\delta) \quad (1.2)$$

The signal vector $S(\delta)\in\mathbb{R}^n$ is formed component-wise from the individual cross-correlations:

$$S(\delta):=\begin{pmatrix}(l_{ref}*p_1)(\delta)\\(l_{ref}*p_2)(\delta)\\\vdots\\(l_{ref}*p_n)(\delta)\end{pmatrix}\in\mathbb{R}^n. \quad (1.3)$$

The reflected light pulse $l_{ref}$ here depends on the emitted light pulse $l_e$ via a reflection coefficient $a_{ref}>0$ and the background light $l_h\geq 0$:

$$l_{ref}(t)=\alpha_{ref}l_e(t)+l_h \quad (1.4)$$

In the mathematical model, it is assumed that the background light $l_h$ is constant for the short duration of the measurement (cf. equation 1.1). In this case, an additional additive term is measured in an integrating manner. It depends on the integral of the respective shutter function and on the constant intensity of the background light, but not on the phase shift $\delta$. Provided that the shutter functions $p_i$ have the same "mass", i.e. that they satisfy equation (1.5), $$\int p_j(t)dt=\int p_k(t)dt=:\kappa \forall j,k\in[n] \quad (1.5)$$

the following applies with the linearity of the cross-correlation:

$$S(a_{ref},\delta,l_h):=a_{ref}\cdot\begin{pmatrix}(l_e*p_1)(\delta)\\(l_e*p_2)(\delta)\\\vdots\\(l_e*p_n)(\delta)\end{pmatrix}+l_h\cdot\kappa\begin{pmatrix}1\\1\\\vdots\\1\end{pmatrix}. \quad (1.6)$$

The time of flight of the light, and thus the distance, are to be reconstructed from the measured signal. To obtain unique distance information, a mapping $D:\mathrm{Image}(S)\to I$ must exist, where $D\circ S(\alpha_{ref},\delta,l_h)=\delta$. It follows from the equation (1.6) that D has to be invariant with respect to scaling and shifting along the unit vector $1_v$. A shift of the vector-valued signal along the unit vector thus has no influence on the reconstructed distance. This maps the required invariance with respect to background light in the model. Furthermore, the reconstructed distance is independent of a scaling of the signal vector. The invariance with respect to differently reflective surfaces is thus described.

The same applies to a uniquely reconstructable signal:

$$S(1,\delta,0)\neq\alpha_{ref}S(1,\delta',0)+l_h\cdot\kappa\cdot 1_v \forall \alpha_{ref}l_h,\delta\neq\delta'. \quad (1.7)$$

Therefore, Image $(\delta(1,\delta,0))$ can be mapped injectively to $U:=(\mathrm{Span}(1_v)^\perp\cap\partial B^n)$ by a projection $P\cup$, where $\mathrm{Span}(1_v)^\perp$ designates the orthogonal complement of the span of the unit vector and $\partial B^n$ designates the edge of the n-dimensional unit sphere. The set $\mathrm{Span}(1_v)^\perp$ is a subspace of the dimension $n-1$ and $\cup$ is thus topologically equivalent to $\partial B^{n-1}$. D is thus also uniquely defined by the mapping $D|_U\circ P_U$. The curve that defines the mapping $\delta\to S(1,\delta,0)$ is designated as the trajectory of S. It must be free of cuts in order to enable unique distance information.

Properties of the trajectory that reflect certain desired behaviors of the 3D camera in the mathematical model will be described in the following.

FIG. 1A shows an illustration 100 of a signal control for three photodiodes having rectangular pulses for the shutters P0, P1, P2 and the LED. The emitted signal 102 is received as a reflected signal 104 and is received at the three photodiodes in accordance with the shutter functions P0 (106), P1 (108), and P2 (110).

Figure 1B:
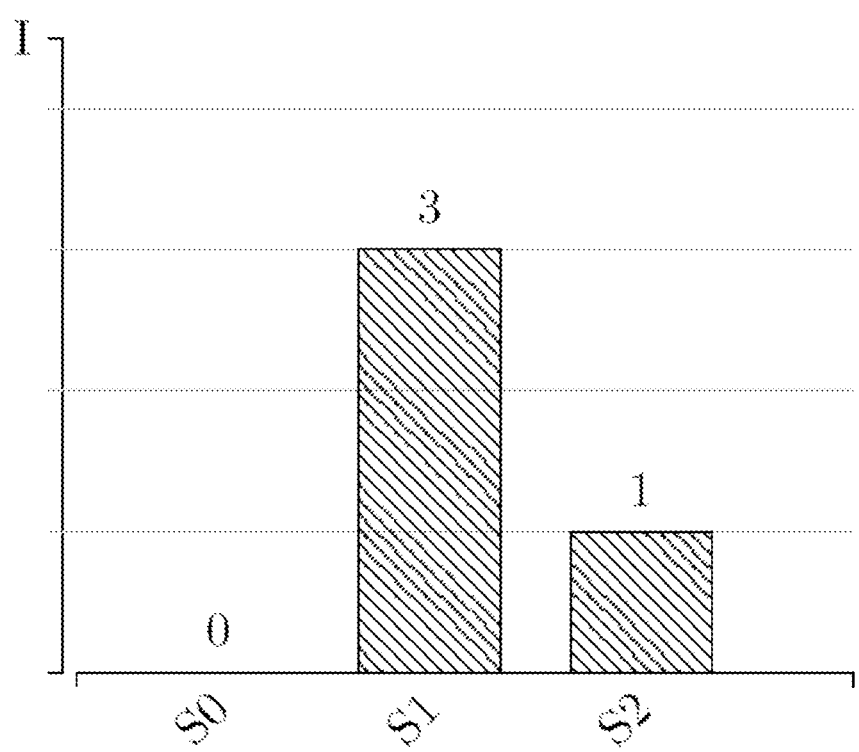
FIG. 1B shows an illustration of the signals received by the respective photodiodes.

FIG. 1B shows an illustration 120 of the signals received by the respective photodiodes. In accordance with the amounts of light, which are shown as hatched areas in FIG. 1A and which are received with the shutter open based on the reflected signal, the signal S0 is equal to 0 and the signal S1 is greater than the signal S2.

Figure 1C:
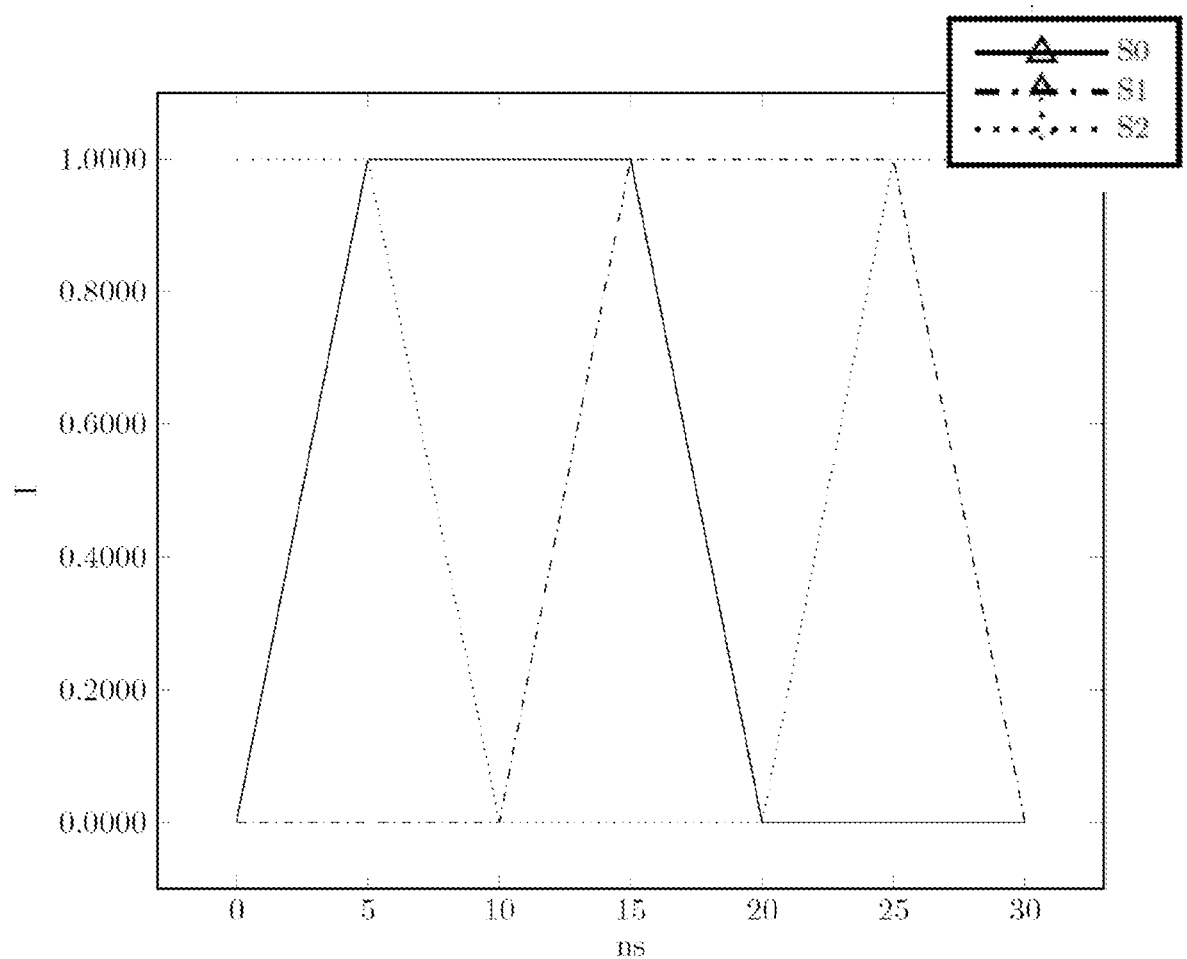
FIG. 1C shows a diagram with the normalized signal development over the time of flight of the light.

FIG. 1C shows a diagram 140 with the normalized signal development $S(\delta)$ over the time of flight of the light. A component of the signal function $S_i$ results from the cross-correlation of the LED signal (that is of the reflected signal) shifted by the time of flight $\delta$ with the i-th component of the shutter function $S_i(\delta)=(\mathrm{LED}*P_i)(\delta)$ using an additional normalization factor.

Figure 1D:
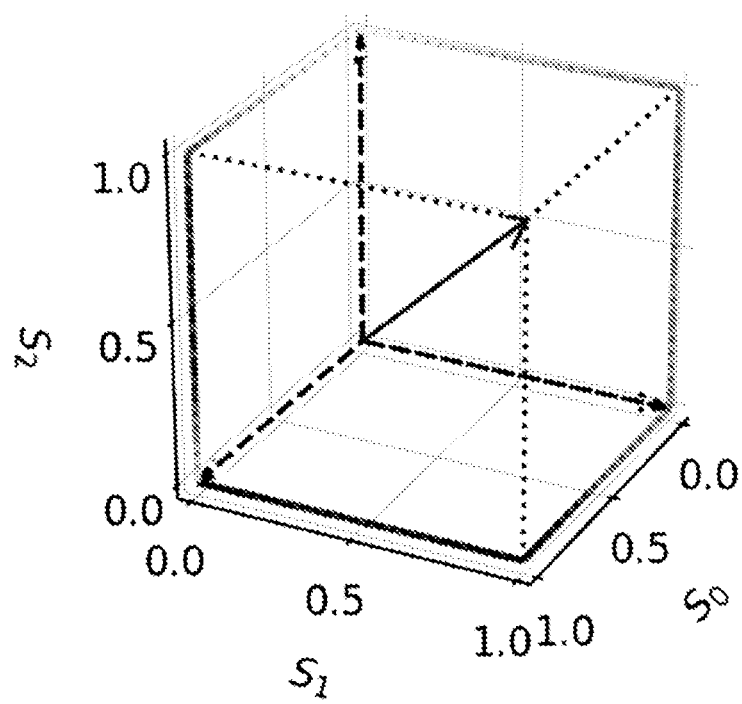
FIG. 1D shows an illustration of the trajectory of the control in accordance with FIG. 1A.

FIG. 1D shows an illustration 160 of the trajectory of the control in accordance with FIG. 1A. The signal development is mapped as a curve in dependence on the phase shift $\delta$ into the signal space that is a 3-dimensional signal space here. The generation of the measured signal by the sensor control in dependence on the time of flight of the light is designated as a signal coding and the determination of the time of flight from the measured signal is designated as a signal decoding or reconstruction.

In real applications of a ToF camera, the emitted light is often reflected a multiple of times. A superposition of the light pulse on the direct path and a sum of pulses on indirect paths thus arise. The reflected light which the sensor receives is formed therefrom. In this way, errors occur in the depth determination from the measured signal. In a typical decoding of the signal, objects thus appear more distant and convex corners appear duller.

Figure 2:
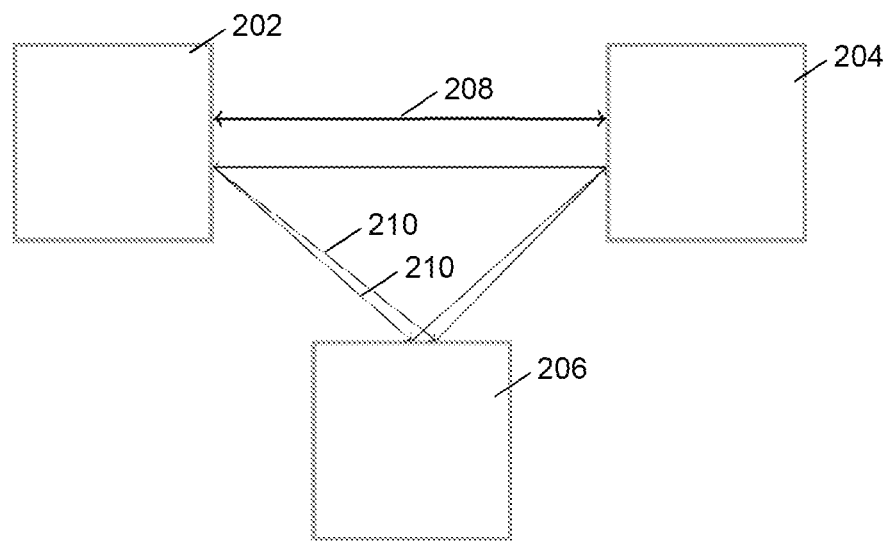
FIG. 2 shows an illustration of a design that can produce multipath effects.

FIG. 2 shows an illustration 200 of a design that can produce multipath effects since, in addition to a direct path 208 between a camera 202 and a first object 204, there are a plurality of indirect paths 210 between the camera 202 and the first object 204 via a second object 206.

In the mathematical model, this behavior is mapped as follows. With the linearity of the cross-correlation, it results for the signal at the i-th diode $$((l_{ref} + l'_{ref}) * p_i)(\delta) = (l_{ref} * p_i)(\delta) + (l'_{ref} * p_i)(\delta) \quad (1.8)$$

and equally $$(l'_{ref} * p_i)(\delta) = \int l'_{ref}(t) p_i(t+\delta) dt = \int (\alpha'_{ref} l_e(t-\delta_{mp})) p_i(t+\delta) dt = \int (\alpha'_{ref} l_e(t)) p_i(t+\delta+\delta_{mp}) dt = \alpha'_{ref}(l_e * p_i)(\delta+\delta_{mp}). \quad (1.9)$$

The variable $\delta_{mp}$ here represents the longer time period which the light requires if it does not reach the sensor again via the direct path. When multipath effects occur, the resulting signal vector M can be written as the sum of different paths with the corresponding coefficients of the reflectivity.

The order of the individual summands does not play a role in this process and is also unimportant for the reconstruction; it is therefore assumed in the following that the individual phase shifts $\delta_i$ are ordered by magnitude.

In the following, properties of the trajectory in the signal space will be emphasized that enable a suitable sensor control that enables a compensation of multipath errors or increases the depth of field of the 3D image. In accordance with the invention, the class of the harmonic signal codings is provided for the multipath case.

In accordance with different embodiments, the measurement is made independent of the influence of the background light and the reflectivity. The methods described here apply irrespectively of the occurrence of multipath effects. The influence of the background light v on the signal can be calculated out in that a second measurement takes place with an inactive illumination. That additive term of the signal which the background light generates is thus determined in the second measurement. If no saturation of the sensor occurs, the difference of the results from both measurements is then free from the influence of the background light. In addition, two measurements can also be performed in succession with different intensities $int_i$ of the illumination. The following then results for the two signals:

$$S_1 = int_1 \cdot S + v, \; S_2 = int_2 \cdot S + v \Rightarrow S = \frac{S_2 - S_1}{int_2 - int_1} \quad (2.1)$$

The resulting signal is then likewise independent of the background light. Therefore, the influence of the background light can from now on generally be neglected. In addition, the reflectivity of the light path, or the sum of the reflectivities in the multipath case, can be determined in advance. For this purpose, a j-th component of the vector-valued signal function must be constant. It then applies for this component of the signal function:

$$M_j(a, \delta) = \sum_{i=1}^{n} a_i S(\delta_i)_j = r \sum_{i=1}^{n} a_i, \text{ where } r = S(\delta)_j. \quad (2.2)$$

The sum of the reflectivities can thus always be determined. A constant component in the signal function can be created in that a shutter function is consistently one over the period. The intensity of the reflected light is thus simply measured in an integrating manner without the phase shift $\delta$ affecting the result. In this case, the cross-correlation formed consistently adopts the value of the integral of the reflected light. Since the cross-correlation is a linear link, a constant component of the signal function can also be formed as the sum of a plurality of components of the signal function whose shutter functions in total result in the unit function. If the sum of the reflectivities $\Sigma_{i=1}^{n} \alpha_i$ is now determined in this way, the signal $M = \Sigma_{i=1}^{n} \alpha_i S(\delta_i)$ can be normalized, i.e.:

$$M_{norm} = \frac{M}{\sum_{i=1}^{n} a_i} = \sum_{i=1}^{n} \frac{a_i}{\sum_{i=1}^{n} a_i} S(\delta_i). \quad (2.3)$$

Thus, the sum of the reflection coefficients for a normalized signal is 1. Viewed geometrically, on the superposition of n different light paths, the normalized signal can therefore be described as a convex combination of n points on the trajectory in the multidimensional signal space.

The influence of the multipath effect on the signal will be described in the following. A superposition of different light paths occurs during the depth measurement. The following thus results for the normalized signal: $M(a,\delta) = \Sigma_{i=1}^{n} \alpha_i S(\delta_i)$, where $\Sigma_{i=1}^{n} \alpha_i = 1$ now additionally applies. The normalized signal is therefore a convex combination of n points on the signal curve and thus lies in its convex hull. To enable a unique reconstruction of the normalized signal, the phase shifts ordered by length have to be uniquely reconstructable from the corresponding signal function, from which it follows:

$$\delta \neq \delta' \Rightarrow \; < M(a, \delta) \neq M(b, \delta') = \sum_{i=1}^{n} a_i S(\delta_i) \neq \sum_{i=1}^{n} b_j S(\delta'_i) \forall \; a_i, \quad (2.4)$$

$$b_i > 0: \sum_{j=1}^{n} a_j = \sum_{j=1}^{n} b_j = 1$$

Consequently, the sets of convex combinations of in each case n points on the signal curve have to be disjoint for pairwise different points. When these combinations intersect, 2n pairwise different points lie on the signal curve in an affine subspace of the dimension 2n−2. This therefore provides an indication of a signal coding that is possibly not reconstructable in a unique manner. The equation (2.4) is invariant for bijective affine-linear transformations of the signal function.

If L: $\mathbb{R}_n \to \mathbb{R}_n$, L(x)=Ax +v, where A∈ $\mathbb{R}^{n \times n}$: A regular and v∈ $\mathbb{R}^n$. It follows from this:

$\Sigma_{i=1}^{n} \alpha_i L(S(\delta_i)) \neq \Sigma_{j=1}^{n} b_j L(S(\delta'_j))$
$\Leftrightarrow \Sigma_{i=1}^{n} \alpha_i (A \cdot S(\delta_i) + v) \neq \Sigma_{j=1}^{n} b_j (A \cdot S(\delta'_j) + v)$
$\Leftrightarrow A(\Sigma_{i=1}^{n} \alpha_i S(\delta_i) + v \neq A(\Sigma_{j=1}^{n} b_j S(\delta'_j)) + v$
$\Leftrightarrow A(\Sigma_{i=1}^{n} \alpha_i S(\delta_i)) \neq A(\Sigma_{j=1}^{n} b_j S(\delta'_j))$
$\Leftrightarrow \Sigma_{i=1}^{n} \alpha_i S(\delta_i) \neq \Sigma_{j=1}^{n} b_j S(\delta'_j)$ The reconstructability in the multipath case of a signal curve that represents a certain sensor control thus does not depend on bijective affine-linear transformations of the trajectory. These degrees of freedom can be used to achieve further desired properties or a good technical realization.

The image structure of the normalized multipath effect in the signal space will be described in the following. The simplest multipath case, which results from the superposition of exactly two different light paths, will be considered first here. Under these circumstances, the multipath vector is composed as $$M(\delta_1,\delta_2,\alpha)=(1-\alpha)S(\delta_1)+\alpha S(\delta_2) \quad (2.5)$$

where it applies: $0<a<1$.

In accordance with different embodiments, the class of the harmonic signal coding is provided. It can be assumed in a simplified manner that the signals are normalized and free of background light. This state may also be established by forming the difference of a plurality of signals.

To compensate the error that arises from the multipath effect, a multi-frequency procedure is used in accordance with different embodiments. The measured signals of the sensor can be mathematically modeled by a signal vector. In this case, the signal vector S is composed of sinusoidal functions with possibly different frequencies $f_i$ (for example, a first frequency $f_1$ and a second frequency $f_2$) and phase shifts $\phi_i$:

$$S(\delta) = \begin{pmatrix} \sin(f_1 \cdot \delta + \phi_1) \\ \sin(f_2 \cdot \delta + \phi_2) \\ \vdots \\ \sin(f_n \cdot \delta + \phi_n) \end{pmatrix} \quad (2.6)$$

These signal developments can be technically produced in that a plurality of measurements follow one another. In this process, the intensity of the light source is harmonically modulated with the corresponding frequency $f_i$. The shutter functions are rectangular and periodic with the frequency $f_i$. The phase shift $\phi_i$ can arise via the selection of the points in time when the shutters are opened or closed.

In this respect, the first component of $S(\delta)$ can then be an example of a first value of light signals received in the time-of-flight camera in the first frequency $f_1$ and the second component of $S(\delta)$ can be an example of a second value of light signals received in the time-of-flight camera in the second frequency $f_2$.

The following equation results for the general multipath case without background light:

$$M(\delta, a) = M((\delta_1, \ldots, \delta_n), (a_1, \ldots, a_n)) = \sum_{i=1}^{n} a_i S(\delta_i) \quad (2.7)$$

The multipath vector measured in the multipath case results from a linear combination of the signal vectors. Since the sum of the reflectivities $a_i$ can be determined, as described above, it is assumed in a simplified manner that $\sum_{i=1}^{n} \alpha_i = 1$.

Lemma 1. With more than two phase-shifted measurements for the same frequency, the signal coding for the general multipath case (without background light) is overdetermined.

Proof: Let $M = \sum_{i \in N} \alpha_i S(\delta_i)$. It then applies for the r-th component $M_r$ of M that $M_r = \sum_{i \in N} \alpha_i \cdot \sin(f_r \cdot \delta + \phi_r)$
$= \sum_{i \in N} a_i \cdot (\cos(\phi_r) \cdot \sin(f_r \cdot \delta) + \sin(\phi_r) \cdot \cos(f_r \cdot \delta))$
$= \cos(\phi_r) \cdot \sum_{i \in N} \alpha_i \cdot \sin(f_r \cdot \delta) + \sin(\phi_r) \cdot \sum_{i \in N} \alpha_i \cos(f_r \cdot \delta)$.

The coefficients $a_i$ reproduce the influence of the reflectivities of the different paths and the equivalence results from the addition theorems. If a respectively two different phase shifts are selected at the same frequency, the resulting system of equations can be solved in a unique manner in accordance with $\sum_{i \in N} a_i \sin(f_r \cdot \delta_i)$ and $\sum_{i \in N} a_i \cos(f_r \cdot \delta_i)$ if the difference of the selected phases is not a multiple of $\pi$ and all the values for further phase shifts are determined therefrom at the same frequency $f_r$.

Therefore, the two phase shifts for the different frequencies will always amount to 0 and $\pi/2$ in the following. The trigonometric functions sin and cos are therefore selected. For a different selection of the two phases, the resulting signal can be transformed with Lemma 1 for the control with sin and cos. In a sensor control with more than two different phase shifts for a specific frequency, the values for sin and cos can in so doing be concluded by means of the method of least squares and pseudoinverses. In accordance with different embodiments, a suitable frequency ratio is provided for the multipath case. The signal vector is now:

$$S(\delta) = \begin{pmatrix} \cos(f_1 \cdot \delta) \\ \sin(f_1 \cdot \delta) \\ \cos(f_2 \cdot \delta) \\ \sin(f_2 \cdot \delta) \\ \vdots \\ \cos(f_n \cdot \delta) \\ \sin(f_n \cdot \delta) \end{pmatrix} \quad (2.8)$$

The simplest multipath case with only two paths will be described in the following. Under these circumstances, the multipath vector is composed as $$M(\delta_1,\delta_2,r)=(1-r)S(\delta_1)+rS(\delta_2) \quad (2.9),$$

where it applies: $0 \leq r \leq 1$.

In accordance with different embodiments, the following signal function is used for the case of the multipath problem with two paths:

$$S(\delta) = \begin{pmatrix} \cos(\delta) \\ \sin(\delta) \\ \cos(2\delta) \\ \sin(2\delta) \end{pmatrix} \quad (2.10)$$

The signal space can now be considered as $\mathbb{C}^2$:

$$S(\delta) = \begin{pmatrix} z'_1 \\ z'_2 \end{pmatrix} := \begin{pmatrix} \cos(\delta) + i\sin(\delta) \\ \cos(2\delta) + i\sin(2\delta) \end{pmatrix} \quad (2.11)$$

In this respect, the first component of $S(\delta)$, that is $z'_1$, can then be an example of a first value of light signals received in the time-of-flight camera in the first frequency $f_1$ (for example, $\delta$) and the second component of $S(\delta)$, that is $z'_2$, can be an example of a second value of light signals received in the time-of-flight camera in the second frequency $f_2$ (for example, $2\delta$).

The trajectory of each component thus in each case runs on a unit circle in the complex plane. Said unit circle is thus run through at double the speed for double the frequency. Therefore, the points $z'_1$ and $z'_2$ lie on the corresponding unit circle, usually at different positions. The multipath effect of a normalized signal is modeled as a convex combination of two points on the trajectory. Viewed geometrically, the set of points p1, which results as a convex combination of two fixedly selected points on the unit circle, forms a chord of the circle. The points $p_2$, which result from this convex combination, lie on a further chord of the unit circle. It is possible that this chord degenerates into one point if the endpoints of the chord on the unit circle are mapped to the same point with double the frequency. This happens at exactly a phase difference of $\pi$ between the two phase shifts. Since the signal disturbed by multipath effects results as a convex combination of two points, both components of this signal are always located within the respective unit circle disk. Let $z_1$ now be a fixed value of a signal that was disturbed by multipath effects. The set of all possible convex combinations of phase shifts and reflection ratios, whose signal results in the first component $z_1$, is determined in a one-dimensional and unique manner via the angle $\gamma$. In this respect, $\gamma$ describes the angle that is enclosed by the diameter of the circle, which runs through $z_1$, and any desired chord through $z_1$, as shown by way of example in FIG. 3.

Figure 3:
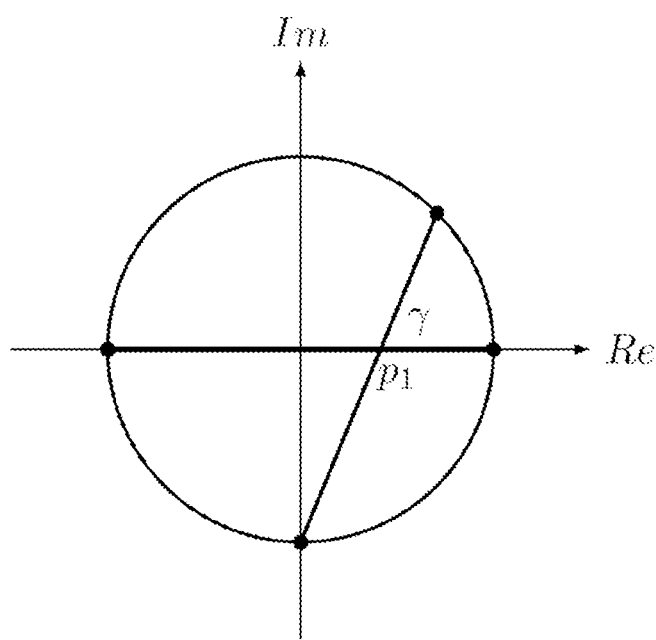
FIG. 3 shows an illustration of an intersecting convex combination.

FIG. 3 shows an illustration 300 of a convex combination intersecting at $p_1$.

For $z_1=0$, the real axis can here be selected as the diameter. The two phase shifts $\delta$ are thus uniquely determined via the end points of this chord. The angle $\gamma$ extends in the half-open interval $$\left[-\frac{\pi}{2}, \frac{\pi}{2}\right[.$$

In this way, there is a bijection between $\gamma$ and the set of two points on the trajectory whose convex combination can result in $z_1$. The following relationships result in so doing via the trigonometric identities.

Let $z_1 = \alpha \cdot e^{i\alpha}$ be written in polar representation. The following then applies for the angles of the two end points of the chord and their associated times of flight $\delta$ in dependence on the angle:

$$\delta_1(a,\alpha,\gamma)=\alpha+\gamma-\arcsin(a\cdot\sin(\gamma)) \quad \delta_2(a,\alpha,\gamma)=-\pi+\alpha+\gamma+\arcsin(a\cdot\sin(\gamma)) \quad (2.12)$$

The angle $\gamma$ can in this respect be an example of an angle that corresponds to a complex number, which is dependent on the first value $z_1$ and the second value $z_2$, in polar representation. The ratio of the reflectivities r can be uniquely determined as follows:

$$r(a, \gamma) = \frac{-a\cos(\gamma)}{2\sqrt{1-a^2\sin^2(\gamma)}} + \frac{1}{2} \quad (2.13)$$

$$M(a, \alpha, \gamma) = (1 - r(a, \gamma)) \cdot S(\delta_1(a, \alpha, \gamma)) + r(a, \gamma) \cdot S(\delta_2(a, \alpha, \gamma))$$

Every signal can thus be written in dependence on a, $\alpha$, and $\delta$. The above relationships in particular result by using the sine and cosine rules at the unit circle. The values a and $\delta$ can be determined by measuring the signal at the fundamental frequency. For the single path case where a=1, $\delta_1$ with $\alpha$ provides the correct result. The multipath problem can therefore be solved with two paths if the angle $\gamma$ can be determined. For this purpose, the information from the further measurement with a double frequency is used. If $\gamma=0$, the two times of flight have a phase shift of $\pi$ from one another; they are thus mapped to the same point on the unit circle for the double frequency, i.e. $z_2 = e^{2i\alpha}$.

Overall, the following results for the measured value $z_2$ in dependence on $\gamma$ by evaluating and simplifying the equation (2.13) for the second coordinate of the signal function. Without loss of generality, $\alpha=0$ since $\alpha$ causes exactly one rotation of the point $z_2$ around the origin with twice the frequency. It then follows:

$$\text{Re}(z_2) = \left(\frac{a\cos(\gamma)}{2\sqrt{1-a^2\sin^2(\gamma)}} + \frac{1}{2}\right)\cos(2(\gamma - \arcsin(a\sin(\gamma)))) + \quad (2.14)$$

$$\left(\frac{-a\cos(\gamma)}{2\sqrt{1-a^2\sin^2(\gamma)}} + \frac{1}{2}\right)\cos(2(-\pi + \gamma + \arcsin(a\sin(\gamma)))) =$$

$$a^2(-\cos(2\gamma) + 1)^2 + a^2\cos(2\gamma) - \frac{a^2}{2}\cos(4\gamma) - \frac{a^2}{2} + \cos(2\gamma) =$$

$$2a^2\sin^2(\gamma) - 2\sin(\gamma^2) + 1 = (1 - a^2)\cos(2\gamma) + a^2$$

$$\text{Im}(z_2) = \left(\frac{a\cos(\gamma)}{2\sqrt{1-a^2\sin^2(\gamma)}} + \frac{1}{2}\right)\cos(2(\gamma - \arcsin(a\sin(\gamma)))) +$$

$$\left(\frac{-a\cos(\gamma)}{2\sqrt{1-a^2\sin^2(\gamma)}} + \frac{1}{2}\right)\cos(2(-\pi + \gamma + \arcsin(a\sin(\gamma)))) =$$

$$-2a^2\sin(\gamma)\cos(\gamma) + 2\sin(\gamma)\cos(\gamma) = (1 - a^2)\sin(2\gamma)$$

A circle equation with the radius $(1-a^2)$ and the center $a^2$ is thus defined, wherein the circle is run through with double the value of the angle $\gamma$. Now, $\alpha$ provides a rotation of $z_2$ with double the frequency. The points $z_2$ for the fixed point $z_1$ therefore overall form a circle with the radius $1-a^2$ and the center $z_1^2$ in dependence on $\gamma$. The angle $\gamma$ can thus be uniquely determined in order to reconstruct the phase shifts from the superposition of two light paths in the case of a normalized, background light-free signal. In this way, a method of detecting the time of flight on a superposition of two paths results. When the signal is normalized, the "Procedure 1" specified below determines the time of flight of the two paths, as indicated in pseudocode in the following.

---

Procedure 1 Decoding of the normalized signal

1: procedure DECODE($S_1$, $S_2$, $S_3$, $S_4$)  ▷ The normalized signal
2:     $z_1 \leftarrow S_1 + i \cdot S_2$
3:     $z_2 \leftarrow S_3 + i \cdot S_4$  ▷ Representation of $\mathbb{R}^4$ as $\mathbb{C}^2$
4:     $a \leftarrow |z_1|$  ▷ $0 \leq a \leq 1$ for normalized reflectivities
5:     $\alpha \leftarrow \dfrac{\arctan\left(\dfrac{\text{Im}(z_1)}{\text{Re}(z_1)}\right)}{2}$ 6:     $p \leftarrow z_2 - z_1^2$ 7:     $\gamma \leftarrow \dfrac{\arctan\left(\dfrac{\text{Im}(p)}{\text{Re}(p)}\right)}{2}$    ▷ The terms were shortened for a faster time of flight 8:     $\delta_1 \leftarrow \gamma - \arcsin(a \cdot \sin(\gamma - a))$

| Procedure 1 Decoding of the normalized signal |
| --- |
| 9: $\delta_2 \leftarrow -\pi + \gamma + \arcsin(a \cdot \sin(\gamma - a))$ |
| 10: return $(\delta_1, \delta_2)$     ▷ The phase shifts of the two paths |
| 11: end procedure |

In this respect, $S_1$ and $S_2$ (that is the real and imaginary parts of $z_1$) can be examples of the first and second component values of $z_1$. Accordingly, $S_3$ and $S_4$ (that is the real and imaginary parts of $z_2$) can be examples of the first and second component values of $z_2$.

Since the radius of the circle equation described above is known to be $1-a^2$, the possibility is presented of normalizing the signal solely from the data of the four measurements. For a normalized signal S satisfies the equation $|p|=|z_2-z_1^2|=1-a^2$. When the signal $S'=S/s$ is normalized, it thus applies:

$$\left|\frac{z_2}{s} - \left(\frac{z_1}{s}\right)^2\right| = 1 - \left|\frac{z_1}{s}\right|^2 \Rightarrow s^4 - (2|z_1|^2 + |z_2|^2)s^2 + 2\mathrm{Re}(\overline{z_2} \cdot z_1^2)s = \quad (2.15)$$

$$0 \text{ Since } s \text{ has to be} > 0,$$

$$\text{it follows} \Rightarrow s^3 - (2|z_1|^2 + |z_2|^2)s + 2\mathrm{Re}(\overline{z_2} \cdot z_1^2) = 0$$

Let s be genuinely greater than the positive sum of the reflectivities. It then results:

$$\left|\frac{z_2}{s} - \left(\frac{z_1}{s}\right)^2\right| * < \left|\frac{z_1^2}{|z_1^2|} - \left(\frac{z_1}{s}\right)^2\right| = \left|\frac{z_1^2}{|z_1^2|}\right| - \left|\left(\frac{z_1}{s}\right)^2\right| = 1 - \left|\frac{z_1}{s}\right|^2.$$

For $s = \sum_{i=1}^{n} a_i$, it applies that $z_1|, |z_2| \leq s$ and $\left|\frac{z_2}{s} - \left(\frac{z_1}{s}\right)^2\right| =$ $$1 - \left|\frac{z_1}{s}\right|^2 = \left|\frac{z_1^2}{|z_1^2|} - \left(\frac{z_1}{s}\right)^2\right| \Leftrightarrow |sz_2 - z_1^2| = \left|\frac{s^2 z_1^2}{|z_1^2|} - z_1^2\right|.$$

For $s > \sum_{i=1}^{n} a_i \cdot$ the inequation $*$ then applies and in this case $$s^3 - (2|z_1|^2 + |z_2|^2)s + 2\mathrm{Re}(\overline{z_2} \cdot z_1^2) > 0.$$

Thus, the largest zero point of the reduced cubic equation $$s^3-(2|z_1|^2+|z_2|^2)s+2\mathrm{Re}(\overline{z}_2 \cdot z_1^2)=0 \quad (2.16)$$

results in the sum of the reflectivities. Thus, one obtains the procedure specified below as "Procedure 2" to normalize the signal. This zero point can be selected as the normalization factor. The zero point can be an example of the total scalar value that is based on the first value and the second value.

When the phase shifts have thus been determined, the associated reflectivities can be determined by solving the corresponding system of linear equations for the corresponding pixel. The stability of the procedure will be analyzed in the following. For this purpose, randomly generated noise is added to randomly generated signals within the framework of a Monte Carlo method and the correctness of the result is subsequently checked. The correctness is assumed as given here if the phase difference in the radian measure between the true time of flight $\delta_1$ with the higher reflectivity and the reconstructed time of flight $\delta_{re}$ amounts to less than $10^{-4}$. In practice, the useful signal is usually stronger than the interference signal. Therefore, the path with the higher reflexivity, which thus influences the signal the most, is here considered as the time of flight to be reconstructed $\delta_{re}$. For this purpose, the two times of flight $\delta_1, \delta_2 \in [-\pi, \pi]$ and the reflexivity $r \in [0,1]$ are selected randomly in a uniformly distributed manner. Thus, random signals are generated to which a noise with a Gaussian distribution is added.

Figure 4:
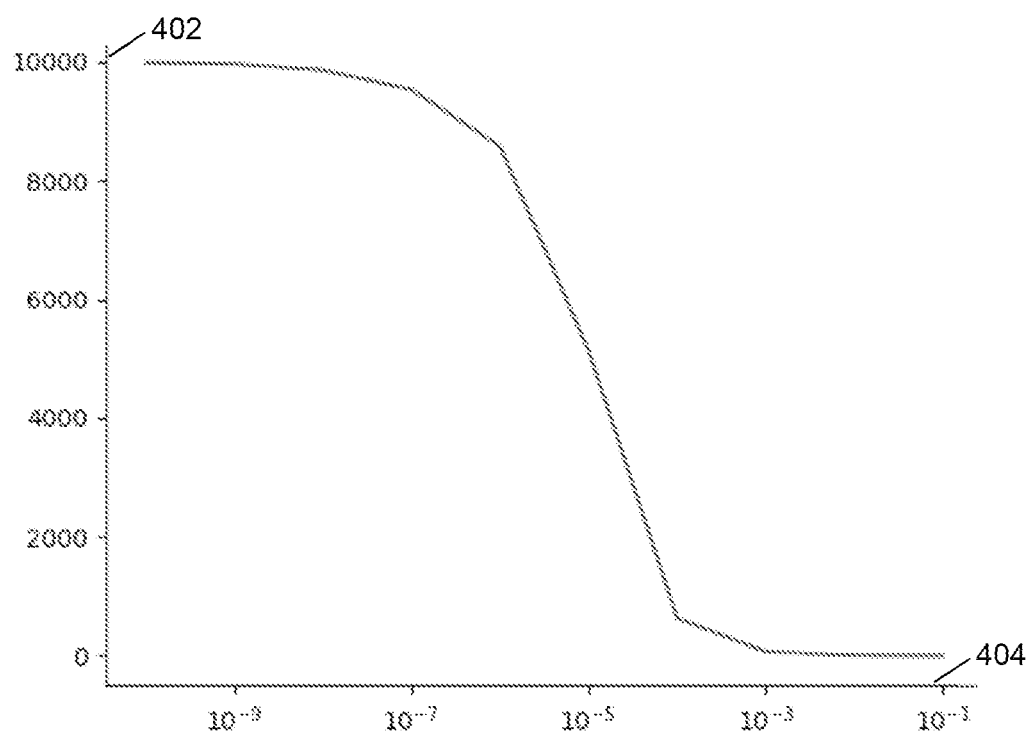
FIG. 4 shows an illustration of the number of correct reconstructions.

FIG. 4 shows an illustration 400 of the number of correct reconstructions 402 entered against the standard deviations of the Gaussian distribution 404 from $10^{-10}$ to $10^{-1}$. 10,000 random signals were generated each time; the maximum number of correct reconstructions therefore amounts to 10,000.

Figure 5:
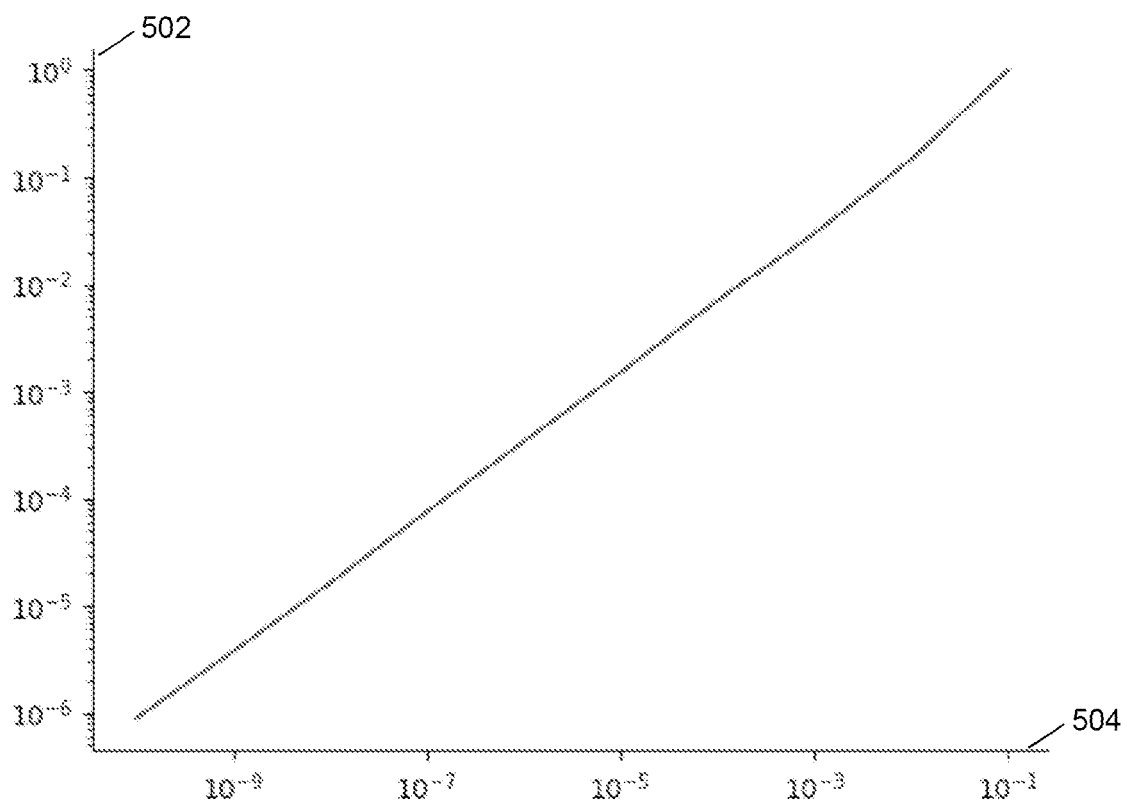
FIG. 5 shows an illustration of an arithmetic mean of an absolute error.

FIG. 5 shows an illustration 500 of the arithmetic mean of the absolute error 502 over the standard deviation of the Gaussian noise 504; here, 100,000 random signals were generated in each case.

As shown above, unique distance information can be reconstructed on a superposition of two light paths. A multi-frequency procedure with two modulation frequencies is used in so doing; the frequency ratio is 2 to 1.

In accordance with different embodiments, a different frequency ratio can, however, also be selected, for example, a frequency ratio of 3 to 1.

With a frequency ratio of 3 to 1, all the possible combinations of times of flight of the two light paths can no longer be uniquely reconstructed. However, a large number of measured signal values could nevertheless be uniquely associated with two light paths for the superpositions that occur in practice. The signal function now considered is:

| Procedure 2 Normalization of the measured signal | |
| --- | --- |
| 1: procedure NORMALIZE($S_1, S_2, S_3, S_4$) | ▷ The measured signal |
| 2:    $z_1 \leftarrow S_1 + i \cdot S_2$ | |
| 3:    $z_2 \leftarrow S_3 + i \cdot S_4$ | ▷ Representation of $\mathbb{R}^4$ as $\mathbb{C}^2$ |
| 4:    $c \leftarrow -2 \cdot |z_1|^2 - |z_2|$ | |
| 5:    $d \leftarrow 2 \cdot \mathrm{Re}(\overline{z}_2 \cdot z_1^2)$ | ▷ Coefficient of the reduced cubic equation |
| 6:    $s \leftarrow \sqrt{-\frac{4}{3} \cdot c} \cdot \cos\left(\frac{1}{3} \cdot \arccos\left(\frac{-d}{2} \cdot \sqrt{\frac{-27}{c^3}}\right)\right)$ | ▷ Cardano's formula |
| 7:    return $\left(\frac{S_1}{s}, \frac{S_2}{s}, \frac{S_3}{s}, \frac{S_4}{s}\right)$ | ▷ The normalized signal |
| 8: end procedure | |

$$S(\delta) = \begin{pmatrix} \cos(\delta) \\ \sin(\delta) \\ \cos(3\delta) \\ \sin(3\delta) \end{pmatrix} \qquad (2.17)$$

In accordance with different embodiments, a reconstruction is provided in closed form. "Procedure 3" specified in the following for decoding the normalized signal is similar to the case of a multi-frequency procedure with a double upper frequency and is based on similar geometric considerations.

---

Procedure 3 The decoding of the normalized signal with a threefold harmonic

1: procedure DECODE($S_1$, $S_2$, $S_3$, $S_4$)  ▷ The measured signal
2:    $z_1 \leftarrow S_1 + i \cdot S_2$
3:    $z_2 \leftarrow S_3 + i \cdot S_4$  ▷ Representation of $\mathbb{R}^4$ as $\mathbb{C}^2$
4:    $a \leftarrow |z_1|$  ▷ $0 \leq a \leq 1$ for normalized reflectivities
5:    $\alpha \leftarrow \arctan\left(\frac{\text{Im}(z_1)}{\text{Re}(z_1)}\right)$
6:    $p1 \leftarrow a \cdot e^{3i\alpha}$
7:    $p \leftarrow z_2 - p1$
8:    $\gamma \leftarrow \dfrac{\arctan\left(\frac{\text{Im}(p)}{\text{Re}(p)}\right) - 3\alpha}{2}$
9:    $\delta_1 \leftarrow \alpha + \gamma - \arcsin(a \cdot \sin(\gamma))$
10:   $\delta_2 \leftarrow \pi + \alpha + \gamma + \arcsin(a \cdot \sin(\gamma))$
11:   return ($\delta_1$, $\delta_2$)  ▷ The phase shifts of the two paths
12: end procedure

---

The normalization of the signal in accordance with different embodiments will be described in the following. The general parameter representation of a cardioid in polar coordinates with the angle $\gamma$ and parameter c is: $r(\gamma) = 2c(1-\cos(\gamma))$. With a fixed selection of the point $z_1 = ae^{\alpha i}$, the complex numbers p for all possible signals in the image of $M(a, \delta)$ form a cardioid in the complex unit circle, where parameter $c = a - a3s$. A normalized signal S thus satisfies the equation $|p| = 2*(a - a3)(1 - \cos(\gamma))$.

The signal $$S' = \frac{S}{s},$$

where $s > 0$, is thus normalized when it applies:

$$\frac{|p|}{s} = 2\left(\frac{a}{s} - \frac{a^3}{s^3}\right)(1 - \cos(\gamma)) \Rightarrow \left(\frac{|p|}{1 - \cos(\gamma)} - 2a\right)s^2 = \qquad (2.18)$$

-continued $$-2a^3 (s > 0) \Rightarrow s = \sqrt{\frac{-2a^3}{\frac{|p|}{1-\cos(\gamma)} - 2a}}$$

"Procedure 4" specified in the following for normalizing the signal results from this equation.

---

Procedure 4 Normalization with a threefold harmonic

1: procedure NORMALIZE ($S_1$, $S_2$, $S_3$, $S_4$)  ▷ The measured signal
2:    $z_1 \leftarrow S_1 + i \cdot S_2$
3:    $z_2 \leftarrow S_3 + i \cdot S_4$  ▷ Representation of $\mathbb{R}^4$ as $\mathbb{C}^2$
4:    $a \leftarrow |z_1|$
5:    $\alpha \leftarrow \arctan\left(\frac{\text{Im}(z_1)}{\text{Re}(z_1)}\right)$
6:    $p1 \leftarrow a \cdot e^{3i\alpha}$
7:    $p \leftarrow z_2 - p1$
8:    $\gamma \leftarrow \arctan\left(\frac{\text{Im}(p)}{\text{Re}(p)}\right) - 3\alpha$
9:    $d \leftarrow \dfrac{|p|}{1 - \cos(\gamma)} - 2a$  ▷ No normalization is possible when the denominator is $d \geq 0$

| Procedure 4 Normalization with a threefold harmonic |
|---|
| 10: $\quad s \leftarrow \sqrt{\dfrac{-2a^3}{d}}$ |
| 11: $\quad \text{return}\left(\dfrac{S_1}{s}, \dfrac{S_2}{s}, \dfrac{S_3}{s}, \dfrac{S_4}{s}\right)$ ▷ The normalized signal |
| 12: end procedure |

The superposition of three light paths will be described in the following. A normalized multipath effect that results as a superposition of three paths can be described by the following mapping:

$$M(a, \delta) = \sum_{i=1}^{3} a_i S(\delta_i) = a_1 S(\delta_1) + a_2 S(\delta_2) + a_3 S(\delta_3) \quad (2.19)$$

$$\text{where } 0 \leq a_1, a_2, a_3 : a_1 + a_2 + a_3 = 1$$

In analogy to the case with two light paths and the above considerations, the signal vector S can be selected as a signal function in this case as follows:

$$S = (\delta_i) = \begin{pmatrix} \cos(\delta_i) \\ \sin(\delta_i) \\ \cos(2\delta_i) \\ \sin(2\delta_i) \\ \cos(3\delta_i) \\ \sin(3\delta_i) \end{pmatrix} \quad (2.20)$$

The trajectory therefore runs in a six-dimensional signal space. Let $S_m$ now be the signal disturbed by multipath effects; the following method is now used to reconstruct the signal.

$$Er(S_m, a, \delta) = \|S_m - M(a, \delta)\| \quad (2.21)$$

The equation describes the error between the measured signal and the modeled signal. The reconstructed times of flight δ then result by means of:

$$\text{Re}(S_m) =_{\delta, a} \text{arg min} Er(S_m, a, \delta) \quad (2.22)$$

If the times of flight can be uniquely reconstructed and the measured signal $S_m$ lies in Image(M), Re($S_m$) is well-defined in any case. For Er($S_m$, a, δ) has exactly one zero point in this case. The reconstructed times of flight can be determined using numerical minimizers. For this purpose, start values can be predefined that are close to the point at which the minimum is assumed.

If the times of flight and a signal are predefined, associated reflectivities can be determined as follows. Let the measured signal component $S_m^i := M(a, \delta)_i$ be defined for corresponding a, δ. Thus, it then applies:

$$M(a, \delta) = \sum_{i=1}^{\delta} a_i S(\delta_i) = a_1 S(\delta_1) + a_2 S(\delta_2) + a_3 S(\delta_3) \Rightarrow \quad (2.23)$$

$$S_m^1 = a_1 S_1(\delta_1) + a_2 S_1(\delta_2) + a_3 S_1(\delta_3)$$
$$S_m^2 = a_1 S_2(\delta_1) + a_2 S_2(\delta_2) + a_3 S_2(\delta_3) \Rightarrow$$

$$S_m^1 = a_1 \cos(\delta_1) + a_2 \cos(\delta_2) + a_3 \cos(\delta_3)$$
$$S_m^2 = a_1 \sin(\delta_1) + a_2 \sin(\delta_2) + a_3 \sin(\delta_3).$$

In this respect, the upper index describes the i-th component of the vector-valued signal.

In addition, where $a_1 + a_2 + a_3 = 1$, this causes the following system of linear equations:

$$K(\delta) \cdot a := \begin{pmatrix} \cos(\delta_1) & \cos(\delta_2) & \cos(\delta_3) \\ \sin(\delta_1) & \sin(\delta_2) & \sin(\delta_3) \\ 1 & 1 & 1 \end{pmatrix} \begin{pmatrix} a_1 \\ a_2 \\ a_3 \end{pmatrix} = \begin{pmatrix} S_m^1 \\ S_m^2 \\ 1 \end{pmatrix} \quad (2.24)$$

It can always be uniquely solved for pairwise different values of $\delta_1$, $\delta_2$, $\delta_3$ in the interval $[-\pi, \pi)$ since the matrix $K(\delta)$ has full rank in these cases. In this way, the coefficients a can be estimated by $$a'(\delta, S_m) = K(\delta)^{-1} \begin{pmatrix} S_m^1 \\ S_m^2 \\ 1 \end{pmatrix} \quad (2.25)$$

in an environment around the zero point of Er($S_m$,a,δ). Thus, a further error function results $$E'_r(S_m, \delta) = \|S_m - M(a'(\delta, S_m), \delta)\| \quad (2.26)$$

and the associated reconstructed times of flight with $$\text{Re}(S_m) =_\delta \text{arg min} Er'(S_m, \delta) \quad (2.27)$$

If $S_m$ lies in Image(M), this error function also has a zero point that is unique with an injectivity of M. In this case, the number of variables via which minimization takes place can be halved. The search space is now only three-dimensional.

Values for the three times of flight now have to be specified as the start value for the numerical optimizers. The results of the closed form can in this respect be used for two times of flight.

Good results can be obtained with the start values ($\phi_1 - \epsilon$, $\phi_2 - \epsilon$, $\phi_2 + \epsilon$), wherein the times of flight ($\phi_1$, $\phi_2$) are the solutions of the closed form for the superposition of two light paths that provide good approximations for the start values. The number e represents a small shift of the approximations that ensures that the matrix $K(\delta)$ has full rank.

A dimensional reduction of the signal space in accordance with different embodiments will be described in the following. In this respect, the signal space is considered as $\mathbb{C}^{3\,3}$. The signal function is then $$S(\delta) = \begin{pmatrix} z_1 \\ z_2 \\ z_3 \end{pmatrix} = \begin{pmatrix} e^{i\delta} \\ e^{2i\delta} \\ e^{3i\delta} \end{pmatrix} \quad (2.28)$$

A shift of the time of flight $\delta$ then has the following effect on the signal:

$$S(\delta + \kappa \cdot 1_V) := \begin{pmatrix} e^{i(\delta+\kappa)} \\ e^{2i(\delta+\kappa)} \\ e^{3i(\delta+\kappa)} \end{pmatrix} = \begin{pmatrix} e^{i\delta} \\ e^{2i\delta} \\ e^{3i\delta} \end{pmatrix} \circ \begin{pmatrix} e^{i\kappa} \\ e^{2i\kappa} \\ e^{3i\kappa} \end{pmatrix} \quad (2.29)$$

In this respect, $\circ$ describes the Hadamard product, that is the component-wise vector multiplication. With the linearity of the sum, this equation also applies in the multipath case. It then applies:

$$M(a, \delta + \kappa \cdot 1_V) = M(a, \delta) \circ \begin{pmatrix} e^{i\kappa} \\ e^{2i\kappa} \\ e^{3i\kappa} \end{pmatrix} \quad (2.30)$$

Let $z_1 = a \cdot e^{i\alpha}$ now be the measured signal that is associated with the fundamental frequency. It then applies:

$$M(a, \delta - \alpha \cdot 1_V) = M(a, \delta) \circ \begin{pmatrix} -e^{i\alpha} \\ -e^{2i\alpha} \\ -e^{3i\alpha} \end{pmatrix}. \quad (2.31)$$

Due to this transformation of the signal, it applies that $Im(z_1)=0$, whereby the dimensionality of the signal space has therefore been reduced. If the times of flight $\delta'$ can now be determined again for the transformed signal, the original times of flight result again with $\delta = \delta' + \alpha \cdot 1_V$. This method analogously also works for signal functions with more than 3 pairwise different frequencies. If the time of flight of one light path was assumed to be known, the remaining two light paths could be determined in closed form and in analogy to the system with two paths via the measurements with the fundamental frequency and the double frequency. Starting from this and using trigonometric transformations, similar to the case with two light paths, the error function can only be set up in dependence on one variable and scalar optimizers can be used to reconstruct the times of flight of the paths.

The invention claimed is:

1. A method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises:

controlling the light source to transmit a plurality of light signals, wherein each light signal has a temporal intensity curve based on a respective frequency, wherein at least a first frequency and a second frequency different from the first frequency are used;

determining at least one first value of light signals received in the time-of-flight camera in the first frequency;

determining at least one second value of light signals received in the time-of-flight camera in the second frequency; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is further based on the determination of an angle that corresponds to a complex number, which is dependent on the first value and the second value, in polar representation, wherein the at least one first value comprises two first component values that can be represented as a first complex number;

wherein the at least one second value comprises two second component values that can be represented as a second complex number; and wherein the angle is determined based on a value or values that corresponds/correspond to a difference between the second complex number and the square of the first complex number.

2. The method in accordance with claim 1, wherein the angle is determined based on a calculation of an arc tangent based on the first value and the second value.

3. The method in accordance with claim 1, wherein the first value corresponds to a first intensity or a first intensity difference; and wherein the second value corresponds to a second intensity or a second intensity difference.

4. The method in accordance with claim 1, wherein the at least one first value comprises two first intensities or two first intensity differences that are determined phase shifted by at least substantially 90° with respect to one another; and wherein the at least one second value comprises two second intensities or two second intensity differences that are determined phase shifted by at least substantially 90° with respect to one another.

5. The method in accordance with claim 1, wherein the second frequency is at least substantially twice as large as the first frequency.

6. A method of determining at least one piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises:

controlling the light source to transmit a plurality of light signals, wherein each light signal has a temporal intensity curve based on a respective frequency, wherein at least a first frequency and a second frequency different from the first frequency are used;

determining at least one first value of light signals received in the time-of-flight camera in the first frequency;

determining at least one second value of light signals received in the time-of-flight camera in the second frequency; and calculating the at least one piece of distance information of the three-dimensional image based on the determined respective first and second values while taking into account at least two paths of the emitted light signals from the light source to the image sensor, wherein the calculation of the at least one piece of distance information of the three-dimensional image is based solely on analytical calculations, and/or exact calculations, and/or non-iterative calculations, and/or non-approximate calculations, wherein the at least one first value comprises two first component values that can be represented as a first complex number;

wherein the at least one second value comprises two second component values that can be represented as a second complex number; and wherein the at least one piece of distance information of the three-dimensional image is further based on an angle determined based on a value or values that corresponds/correspond to a difference between the second complex number and the square of the first complex number.

7. The method in accordance with claim 6, wherein the first value corresponds to a first intensity or a first intensity difference; and wherein the second value corresponds to a second intensity or a second intensity difference.

8. The method in accordance with claim 6, wherein the at least one first value comprises two first intensities or two first intensity differences that are determined phase shifted by at least substantially 90° with respect to one another; and wherein the at least one second value comprises two second intensities or two second intensity differences that are determined phase shifted by at least substantially 90° with respect to one another.

9. The method in accordance with claim 6, wherein the second frequency is at least substantially twice as large as the first frequency.

10. A method of determining a piece of distance information for a three-dimensional image from at least two time-of-flight differences between light signals emitted by a light source of a time-of-flight camera and light signals received by an image sensor of the time-of-flight camera through scattering or reflection of the emitted light signals at at least one object, wherein the method comprises:

determining at least two paths of the emitted light signals from the light source to the image sensor using the method in accordance with claim 1;

determining distance information based on at least three paths of the emitted light signals from the light source to the image sensor by means of an iterative numerical method, wherein, for the iterative numerical method, at least three start values for the at least three paths are determined based on the determined at least two paths.

* * * * *